(12) United States Patent
Nakamura et al.

(10) Patent No.: US 6,333,578 B1
(45) Date of Patent: Dec. 25, 2001

(54) INDUCTION MOTOR

(75) Inventors: Kosei Nakamura, Susono; Michi Masuya; Hisashi Maeda, both of Oshino-mura; Shinpei Uemura, Minamitsuru-gun, all of (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 09/254,006

(22) PCT Filed: Jun. 30, 1998

(86) PCT No.: PCT/JP98/02934

§ 371 Date: Mar. 1, 1999

§ 102(e) Date: Mar. 1, 1999

(87) PCT Pub. No.: WO99/00890

PCT Pub. Date: Jan. 7, 1999

(30) Foreign Application Priority Data

Jun. 30, 1997 (JP) .................................... 9-187241

(51) Int. Cl.[7] .................................... H02K 17/12
(52) U.S. Cl. .................................... 310/166
(58) Field of Search .................................... 310/166, 179, 310/180, 184, 188, 189, 198, 200, 159; 363/104

(56) References Cited

U.S. PATENT DOCUMENTS

| 4,307,311 | * 12/1981 | Grozinger | .......................... 310/179 |
| 4,363,985 | 12/1982 | Matsuda et al. | .......................... 310/184 |

FOREIGN PATENT DOCUMENTS

| 56-117563 | 9/1981 | (JP) . |
| 59-89559 | 5/1984 | (JP) . |
| 1-164294 | 6/1989 | (JP) . |
| 6-6961 | 1/1994 | (JP) . |
| 6-46594 | 2/1994 | (JP) . |

* cited by examiner

*Primary Examiner*—Burton S. Mullins
*Assistant Examiner*—Judson H. Jones
(74) *Attorney, Agent, or Firm*—Staas & Halsey LLP (57) ABSTRACT

An induction motor capable of obtaining a high power characteristic in a wide range without producing induced voltage. A winding for each phase is composed of a plurality of winding components having the same number of turns. When high torque is needed with low speed rotation, a Y-connection in which winding components for each phase are connected in series is formed as shown in FIG. 2*a*. For medium low speed rotation, a Δ-connection in which winding components for each phase are connected in series is formed as shown in FIG. 2*b*. For medium high speed rotation, a Y-connection in which winding components for each phase are connected in parallel is formed as shown in FIG. 2*c*. For high speed rotation, a α-connection in which winding components for each phase are connected in parallel is formed as shown in FIG. 2*d*. Using the entire winding for each phase, the number of turns is decreased stage by stage to switch from low speed rotation to high speed rotation. Since there is no unused part of windings, there is no problem of induced voltage. A fall in power at the time of switching the winding formation can be restrained, so that a high power characteristic can be obtained in a wide range.

1 Claim, 9 Drawing Sheets

INDUCTION MOTOR

TECHNICAL FIELD

The present invention relates to an induction motor driven by a three-phase alternating current supply, and more specifically to an induction motor suitable as a spindle motor for driving a spindle of a machine tool.

BACKGROUND ART

Figure 6A:
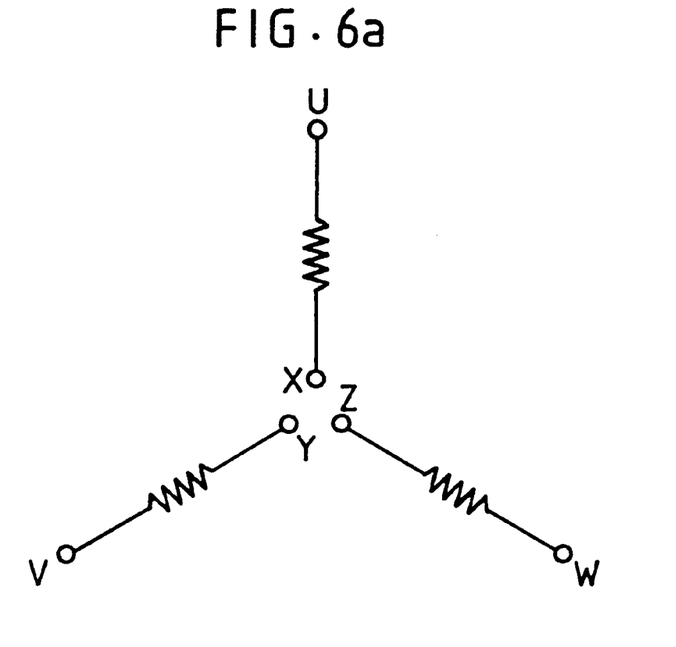
FIGS. 6a and 6b are illustrations for explaining an example of conventional winding formation switching.
Figure 6B:
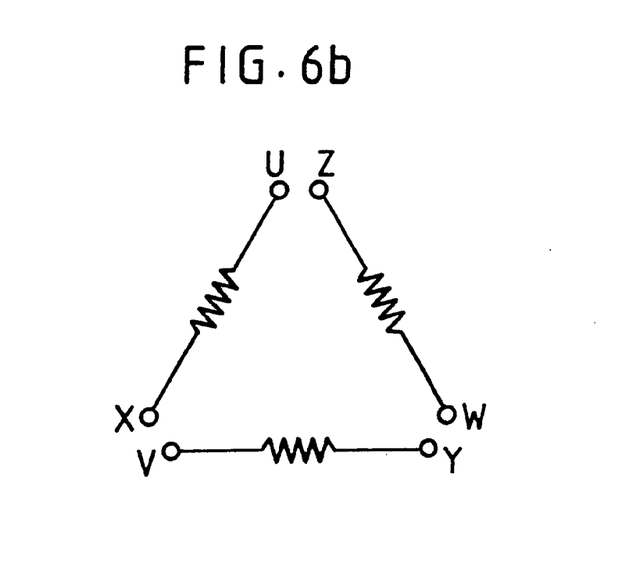

A method of changing characteristics of a motor by changing formation of windings of the motor is conventionally known. FIGS. 6a and 6b show a method of changing characteristics of a motor by connecting windings of the motor as a Y-connection or a Δ-connection. The larger number of turns the winding for each phase has, the larger torque can be produced with low speed rotation. Therefore, when large torque is needed with low speed rotation, the Y-connection (in which terminals X, Y, Z are connected together while power lines of three phases are connected to terminals U, V, W, respectively) as shown in FIG. 6a is selected. (This formation will be referred to as "low speed winding formation".) When high speed rotation is needed, the Δ-connection (in which terminals U and Z, V and X, W and Y are connected respectively and power lines are connected to the respective connecting points) as shown in FIG. 6b is selected. (This formation will be referred to as "high speed winding formation".)

Figure 7A:
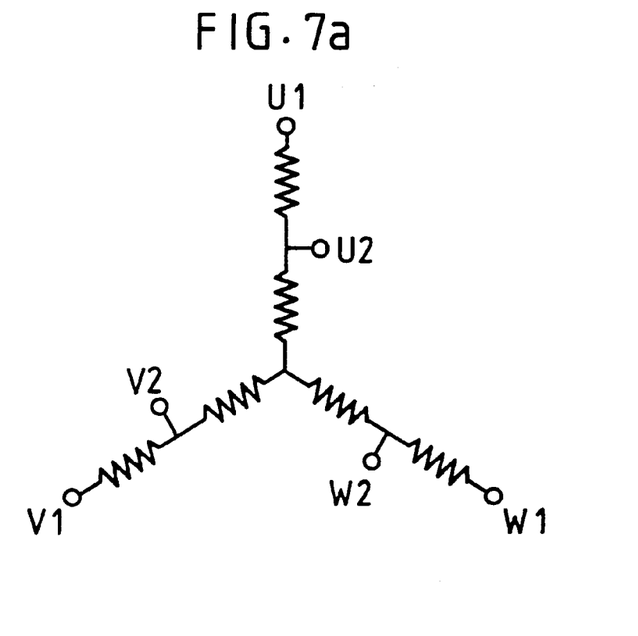
FIGS. 7a and 7b are illustrations for explaining another example of conventional winding formation switching.
Figure 7B:
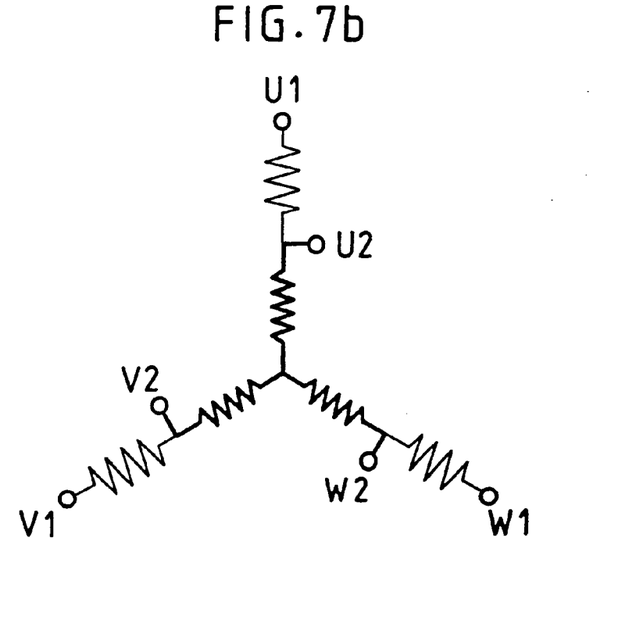

According to another known method, as shown in FIGS. 7a and 7b, a Y-connection of three windings for three phases of a motor is formed with terminals U2, V2, W2 provided at intermediate portions of the three windings. For low speed rotation, as shown in FIG. 7a, power lines of three phases are connected to terminals U1, V1, W1 to thereby use the three entire windings for three phases. (This formation will be referred to as "low speed winding formation".) (It is to be noted that used parts of windings are depicted with bold lines.) For high speed rotation, power lines of three phases are connected to the intermediate terminals U2, V2, W2. (This formation will be referred to as "high speed winding formation".)

Figure 8A:
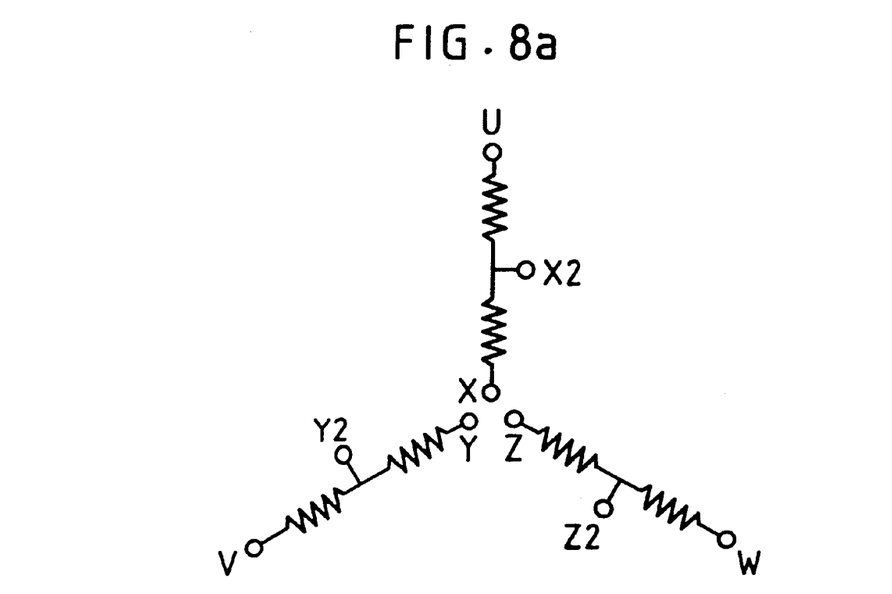
FIGS. 8a and 8b are illustrations for explaining a further example of conventional winding formation switching.
Figure 8B:
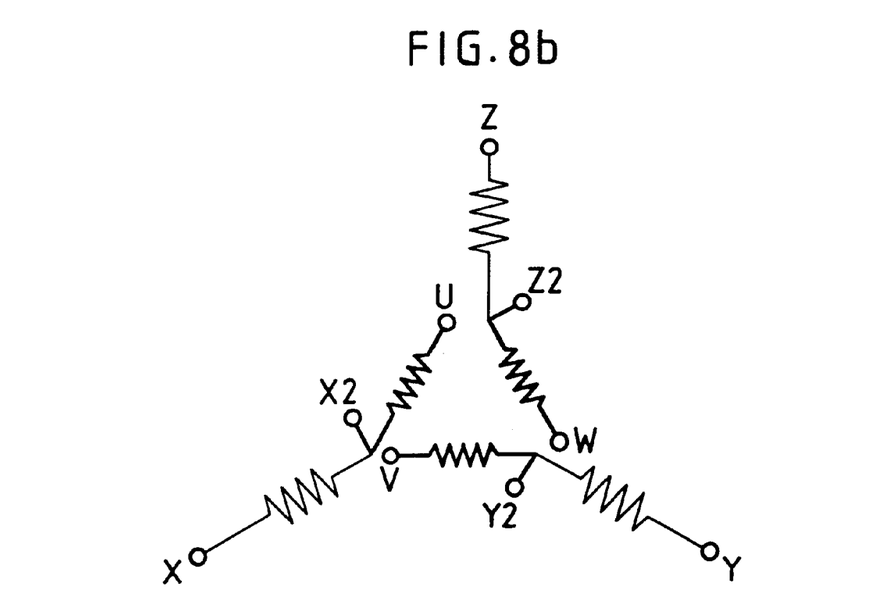

According to another known method, as shown in FIGS. 8a and 8b, intermediate terminals X2, Y2, Z2 are provided at intermediate portions of three windings for three phases. For low speed rotation, as shown in FIG. 8a, terminals X, Y, Z provided at one-side ends of the three windings for three phases are connected together while terminals U, V, W provided at the other ends of the windings are connected to power lines of three phases, respectively, to thereby form a Y-connection in which the three entire windings for three phases are used. (This formation will be referred to as "low speed winding formation".) (It is to be noted that also in FIG. 8, used parts of windings are depicted with bold lines.) For high speed rotation, as shown in FIG. 8b, the terminal U and the intermediate terminal Z2, the terminal V and the intermediate terminal X2, and the terminal W and the intermediate terminal Y2 are connected respectively while power lines of three phases are connected to the terminals U, V, W, respectively, to thereby form a Δ-connection in which only part of each winding for each phase is used. (This formation will be referred to as "high speed winding formation".)

As described above, characteristics of a motor are changed by changing the number of turns for each phase. As understood from the relation between turns ratio and power curves as shown in FIG. 9, in such switching between the low and high speed winding formations, the larger the turns ratio is, the larger torque can be produced with low speed rotation and the higher power can be obtained with high speed rotation.

Figure 9:
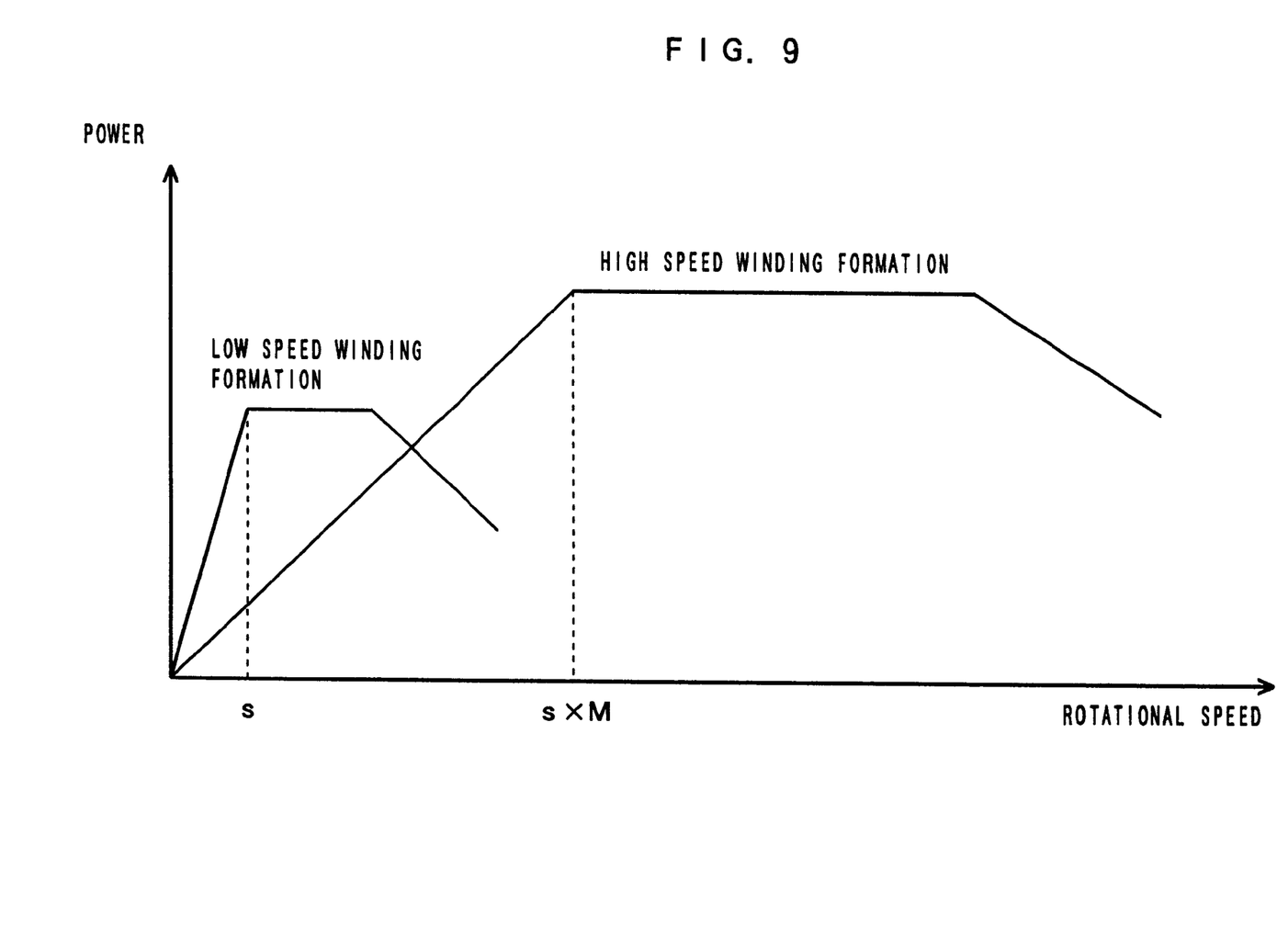
FIG. 9 is a graph showing a power characteristic obtained by conventional winding formation switching.

It is to be noted that in FIG. 9, M denotes the relation where the turns ratio is 1:M.

In the switching method as shown in FIG. 6, the turns ratio of the Δ-connection to the Y-connection is 1 to √3(M=√3) and cannot be changed.

In the switching methods as shown in FIGS. 7a, 7b and FIGS. 8a, 8b, the turns ratio can be arbitrarily determined by choosing the number of turns which are used in the high speed winding formation. (This number of turns depends on positions at which the intermediate terminals are provided). However, when voltage is applied to the parts of windings to be used in high speed winding formation (depicted with bold lines), voltage is induced at the parts of windings not to be used. At that time, if the sum of the input voltage and the induced voltage exceeds the insulation limit voltage, an insulation defect is caused between the windings. Therefore, there exist the maximum turns ratio and the maximum input voltage which ensure that the insulation limit voltage is not exceeded. Thus, the maximum turns ratio is determined of itself.

Further, even if the turns ratio can be large, there is a fall in power characteristic at the time of switching from the low speed winding formation to the high speed winding formation as shown in FIG. 9, which hinders obtaining a high power characteristic in a wide range.

In a machine tool such as a machining center, it is desired that low-speed heavy cutting is possible, and rotating speed of a spindle can be increased to improve the efficiency of cutting work. Thus, a spindle motor for driving a spindle is required to have a larger torque output at a low speed, to have a higher speed, and to have higher power. In order to meet these requirements by switching the winding formation, it is necessary to secure a large turns ratio, and to remove an influence of induced voltage. In addition to securing a large turns ratio, smooth switching from the low speed winding formation to the high speed winding formation which causes only a small fall in power characteristic and does not invite a shortage of output torque is also desired.

DISCLOSURE OF INVENTION

An object of the present invention is to provide an induction motor capable of obtaining a high power characteristic in a wide range without producing induced voltage.

An induction motor of the present invention comprises: two or more winding components provided for each of three phases and having the same number of turns; and a switching circuit for selectively switching connection of the winding components to any one of three or four of a Y-connection in which winding components for each of the three phases are connected in series, a Δ-connection in which winding components for each of the three phases are connected in series, a Y-connection in which winding components for each of the three phases are connected in parallel, and a Δ-connection in which winding components for each of the three phases are connected in parallel. Thus, the induction motor of the present invention can obtain a high power characteristic in a wide range to produce large torque at a low speed and high power at a high speed.

BEST MODE OF CARRYING OUT THE INVENTION

Figure 1A:
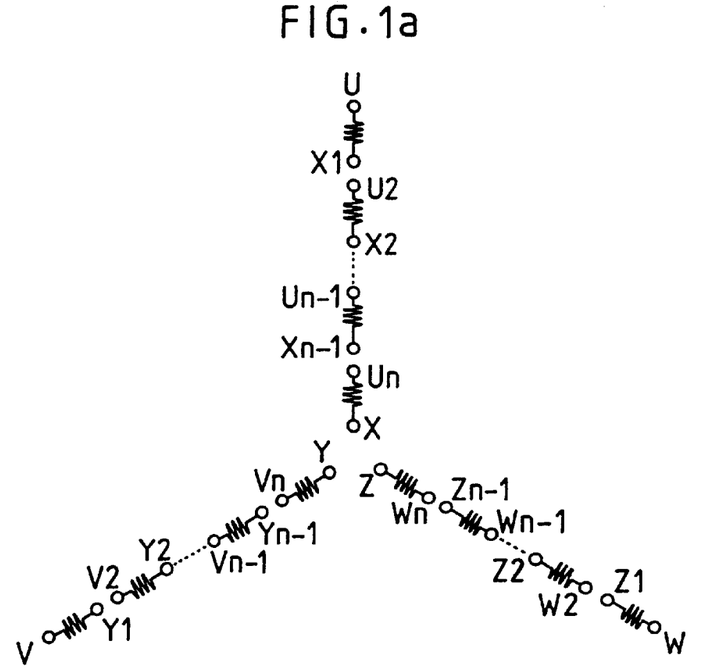
FIGS. 1a and 1b are illustrations for explaining winding formations in an induction motor according to the present invention.
Figure 1B:
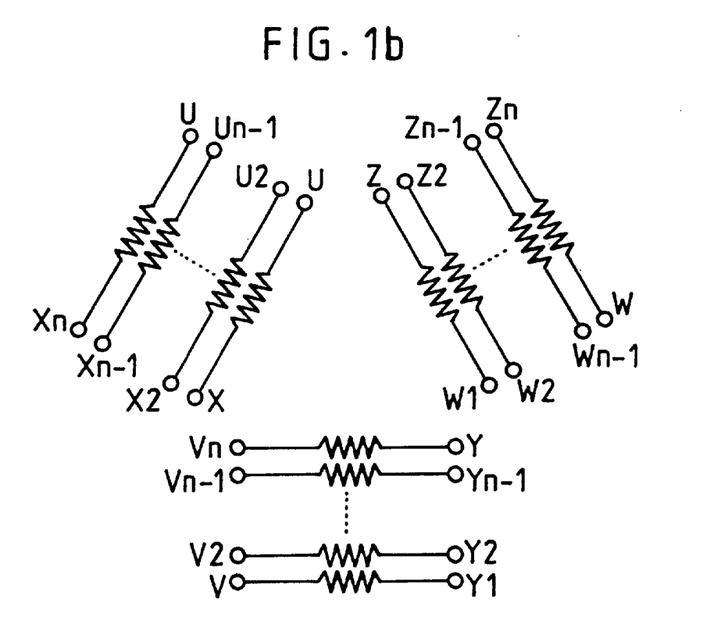

FIG. 1 is an illustration for explaining winding formations in an induction motor according to the present invention. In the present invention, each of three windings for three phases of alternating current is composed of n pieces (n is 2 or larger) of winding components having the same number of turns. When high power is needed with high speed rotation, a Y-connection is formed in which winding components for each phase are all connected in series as shown in FIG. 1a. (This formation will be referred to as "low speed winding formation.) When large torque is needed with low speed rotation, a Δ-connection is formed in which winding components for each phase are all connected in parallel as shown in FIG. 1b. (This formation will be referred to as "high speed winding formation.)

It is to be noted that in FIG. 1, terminals provided at one-side ends of first winding components of three windings for three phases U, V, W are denoted by U, V, W, terminals provided at the other ends of the first winding components by X1, Y1, Z1, terminals provided at one-side ends of second winding components by U2, V2, W2, terminals provided at the other ends of the second winding components by X2, Y2, Y2, terminals provided at one-side ends of (n−1)th winding components by $U_{n-1}, V_{n-1}, W_{n-1}$, terminals provided at the other ends of the (n−1)th winding components by $X_{n-1}, Y_{n-1}, Z_{n-1}$, terminals provided at one-side ends of (n)th winding components by $U_n, V_n, W_n$, and terminals provided at the other ends of the (n)th winding components by $X_n, Y_n, Z_n$.

According to the present invention, intermediate winding formations are provided between the low speed winding formation and the high speed winding formation. In the present embodiment, a low speed winding formation is a Y-connection in which winding components for each phase are connected in series as shown in FIG. 1a. A medium low speed winding formation is a Δ-connection in which winding components for each phase are connected in series. A medium high speed winding formation is a Y-connection in which winding components for each phase are connected in parallel. A high speed winding formation is a Δ-connection in which winding components for each phase are connected in parallel.

This is explained in FIGS. 2a to 2d by using an example where a winding for each phase is composed of two winding components.

Figure 2A:
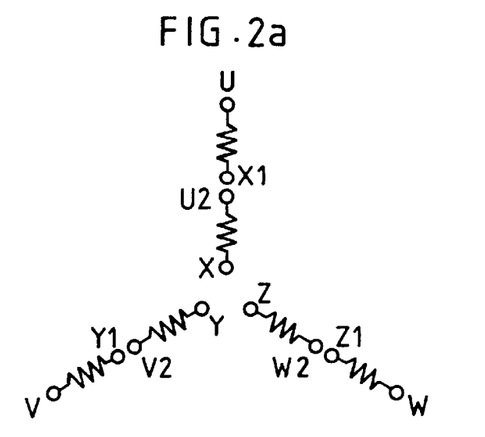
FIGS. 2a–2d are illustrations for explaining winding formations in an embodiment of the present invention.
Figure 2B:
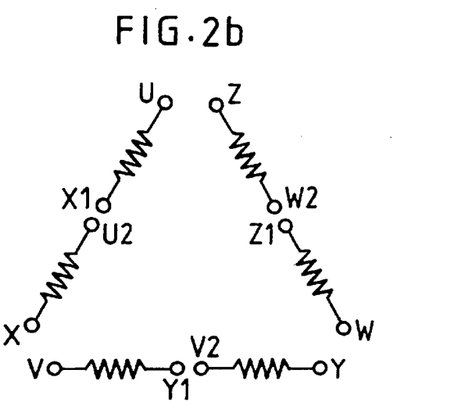

FIG. 2a shows an example where two winding components for each phase are connected in series, terminals X, Y, Z provided at one-side ends of thus formed three series windings are connected to be a neutral point, terminals U, V, W provided at the other ends of the series windings are connected to power lines, respectively, to thereby form a low speed winding formation having a Y-connection. FIG. 2b shows an example of a medium low speed winding formation in which two winding components for each phase are connected in series, and terminals of thus formed three series windings for three phases are connected to each other to thereby form a Δ-connection. In the example of FIG. 2b, terminals U and Z, terminals X and V, and terminals Y and W are connected, respectively, and their connecting points are connected to power lines, respectively, to thereby form a Δ-connection.

Figures 2C, 2D:
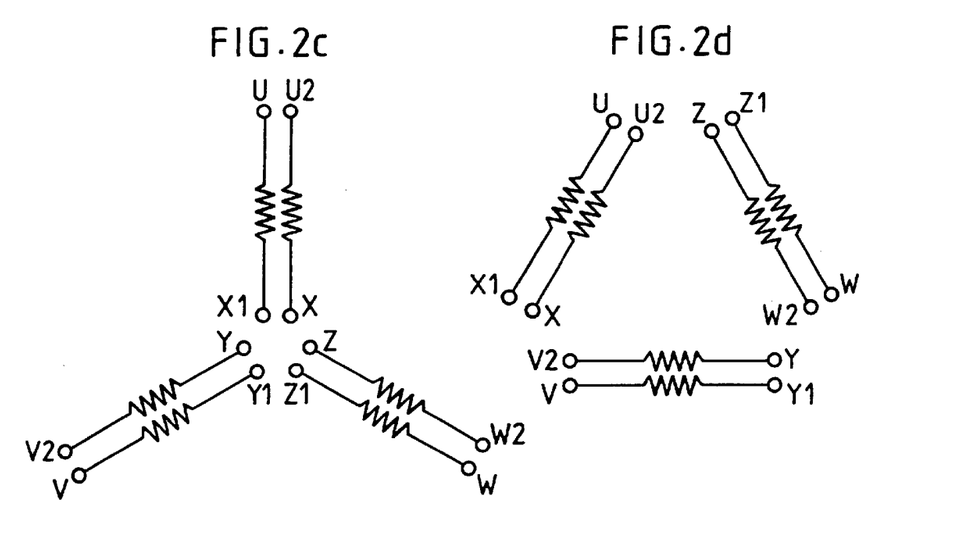

FIG. 2c shows an example of a medium high speed winding formation in which winding components for each phase are connected in parallel, terminals provided at one-side ends of winding components thus connected in parallel are all connected to be a neutral point, to thereby form a Y-connection in which winding components for each phase are connected in parallel, and terminals provided at the other ends of the winding components connected in parallel are connected to power lines, respectively. (Terminals U and U2, terminals V and V2, and terminals W and W2 are connected, respectively, while the other terminals X, X1, Y, Y1, Z, Z1 are all connected to be a neutral point.)

FIG. 2d shows an example of a high speed winding formation in which winding components for each phase are connected in parallel, terminals provided at one-side ends of winding components connected in parallel for one phase are connected to terminals provided at one-side ends of winding components connected in parallel for another phase, to thereby form a Δ-connection in which winding components for each phase are connected in parallel, and thus formed three connecting points of terminals for three phases are connected to power lines, respectively. (In the example of FIG. 2d, terminals U, U2, Z, Z1, terminals V, V2, X, X1 and terminals W, W2 Y, Y1 are connected, respectively.)

In the above winding formations, winding components for each phase have the same number of turns. If the number of turns in the high speed winding formation shown in FIG. 2d is considered as 1, the four winding formations show the following turns ratio:

high speed winding formation:medium high speed winding formation:medium low speed winding formation:low speed winding formation=1:√3:2:2√3.

If n pieces of winding components are allotted for each phase, the four winding formations show the following turns ratio:

high speed winding formation: medium high speed winding formation: medium low speed winding formation: low speed winding formation =1:√3:n:n √3.

Figure 5:
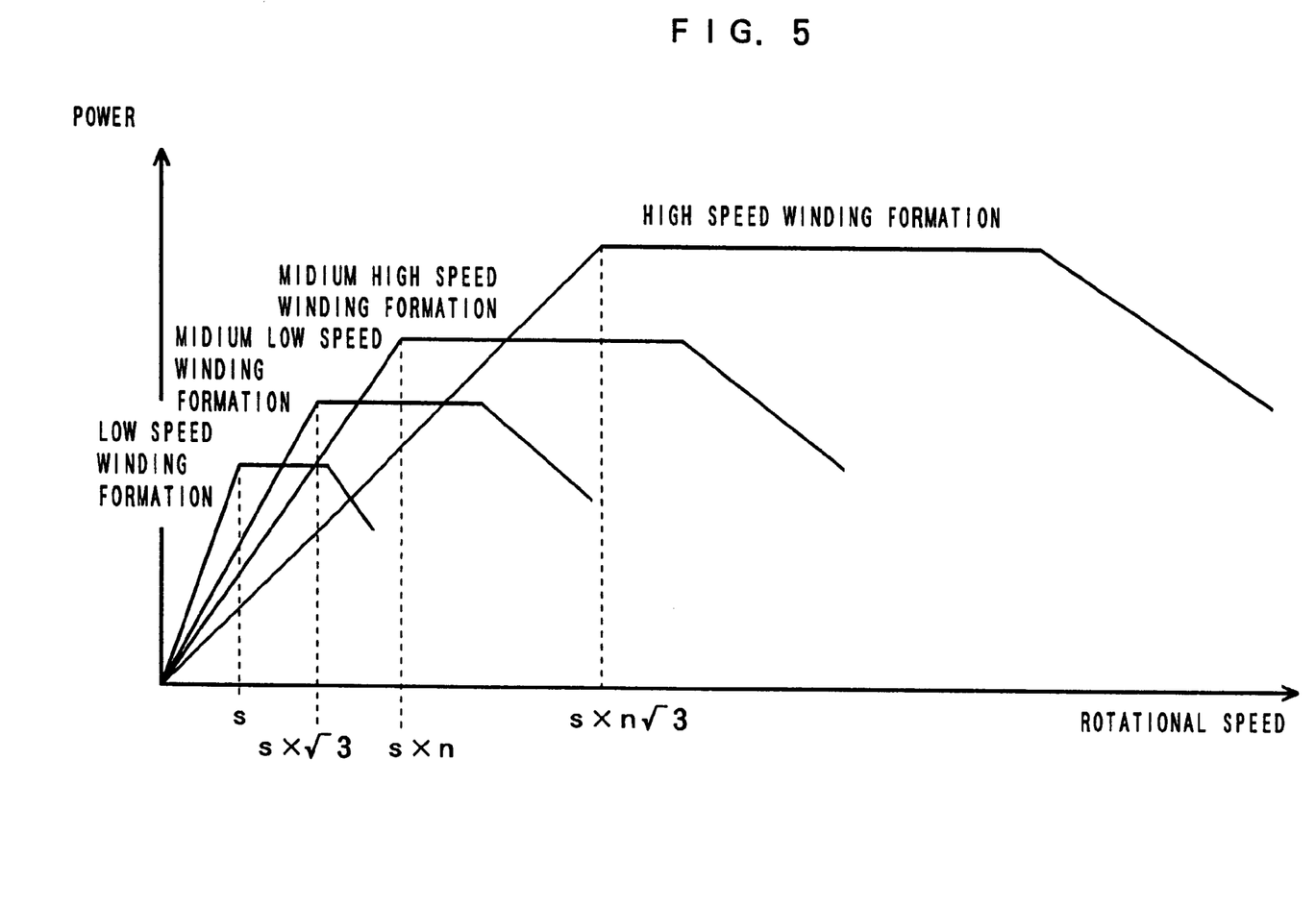
FIG. 5 is a graph showing a power characteristic obtained by switching the winding formation in the present invention.

FIG. 5 is a graph showing a power characteristic obtained by switching between the above described winding formations. It shows that falls in power are restrained by switching from the low speed winding formation toward the high speed winding formation, stage by stage, and that a high power characteristic can be obtained in a wide range.

Figure 3:
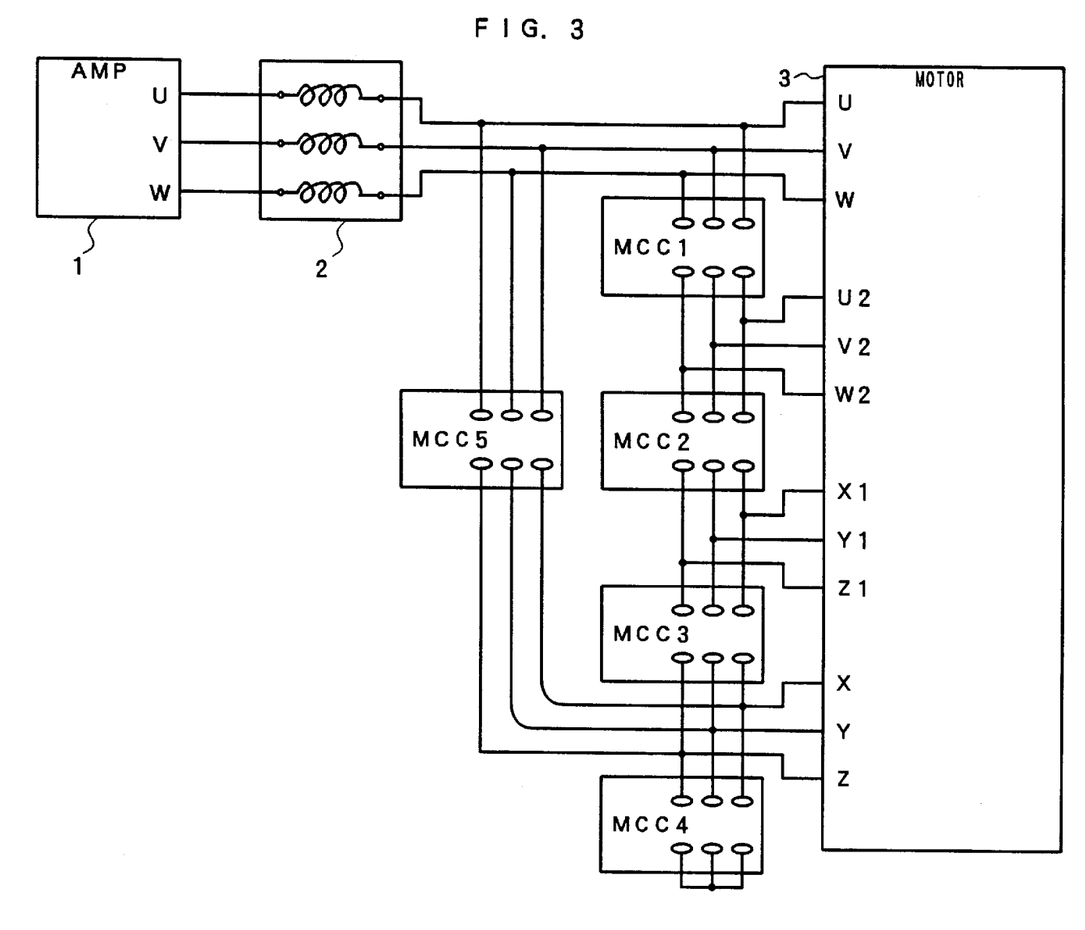
FIG. 3 is a circuit diagram for switching the winding formation in the same embodiment.

FIG. 3 is a circuit diagram for switching the winding formation for the case where two winding components are allotted for each phase as shown in FIGS. 2a to 2d. Three power lines for three phases derived from an amplifier 1 for driving a motor are connected through a reactor 2 to terminals U, V, W of a motor 3, respectively. An electromagnetic contactor MCC1 is connected between the terminals U, V, W and terminals U2, V2, W2 so that the corresponding terminals can be connected each, an electromagnetic contactor MCC2 is connected between the terminals U2, V2, W2 and terminals X1, Y1, Z1 so that the corresponding terminals can be connected each, an electromagnetic contactor MCC3 is connected between the terminals X1, Y1, Z1 and terminals X, Y, Z so that the corresponding terminals can be connected each, an electromagnetic contactor MCC4 is so connected that the terminals X, Y, Z can be all connected together, and an electromagnetic contactor MCC5 is connected between the terminals X, Y, Z and the terminals U, V, W so that the corresponding terminals can be connected each.

Among the winding formations from the low speed winding formation to the high speed winding formation, one is selected by bringing the electromagnetic contactors MCC1 to MMC5 into an on-state or an off-state in accordance with the following table:

|                       | MCC1 | MCC2 | MCC3 | MCC4 | MCC5 |
|---|---|---|---|---|---|
| for low speed         | OFF  | ON   | OFF  | ON   | OFF  |
| for medium low speed  | OFF  | ON   | OFF  | OFF  | ON   |
| for medium high speed | ON   | OFF  | ON   | ON   | OFF  |
| for high speed        | ON   | OFF  | ON   | OFF  | ON   |

If large torque is needed with low speed rotation, the low speed winding formation is selected by bringing the electromagnetic contactors MCC2 and MCC4 into an on-state and the other electromagnetic contactors into an off-state. Since the electromagnetic contactor MCC2 is brought into an on-state, the terminals X1 and U2, Y1 and V2, and Z1 and W1 of the winding components of the motor 3 are connected, respectively, so that winding components for each phase are connected in series as shown in FIG. 2a. Further, since the electromagnetic contactor MCC4 is brought into an on-state, the terminals X, Y, Z are connected together. Thus, the Y-connection in which winding components for each phase are connected in series as shown in FIG. 2a is obtained as the low speed winding formation.

In order to choose the medium low speed winding formation, the electromagnetic contactors MCC2 and MCC5 are brought into an on-state and the other electromagnetic contactors are brought into an off-state. Since the electromagnetic contactor MCC2 is brought into an on-state, winding components for each phase are connected in series as described above. Further, since the electromagnetic contactor MCC5 is brought into an on-state, the terminals U and Z, V and X, and W and Y are connected, respectively. Thus, the Δ-connection in which winding components for each phase are connected in series as shown in FIG. 2b is obtained as the middle low speed winding formation.

In order to choose the medium high speed winding formation, the electromagnetic contactors MMC1, MCC3 and MMC4 are brought into an on-state and the other electromagnetic contactors are brought into an off-state. Since the electromagnetic contactor MCC1 is brought into an on-state, the terminals U and U2, V and V2, and W and W2 of the winding components of the motor are connected, respectively, and since the electromagnetic contactor MCC3 is brought into an on-state, the terminals X1 and X, Y1 and Y, and Z1 and Z are connected, respectively. Thus, winding components for each phase are connected in parallel as shown in FIG. 2c. Further, since the electromagnetic contactor MCC4 is brought into an on-state, the terminals X, Y, Z are connected together. Thus, the Y-connection in which winding components for each phase are connected in parallel as shown in FIG. 2c is obtained as the middle high speed winding formation.

In order to choose the high speed winding formation, the electromagnetic contactors MMC1, MCC3 and MMC5 are brought into an on-state and the other electromagnetic contactors are brought into an off-state. Since the electromagnetic contactors MCC1 and MMC3 are brought into an on-state, winding components for each phase are connected in parallel as described above. Further, since the electromagnetic contactor MCC5 is brought into an on-state, the terminals U and Z, V and X, and W and Y are connected, respectively. Thus, the Δ-connection in which winding components for each phase are connected in parallel as shown in FIG. 2d is obtained as the high speed winding formation.

Figure 4:
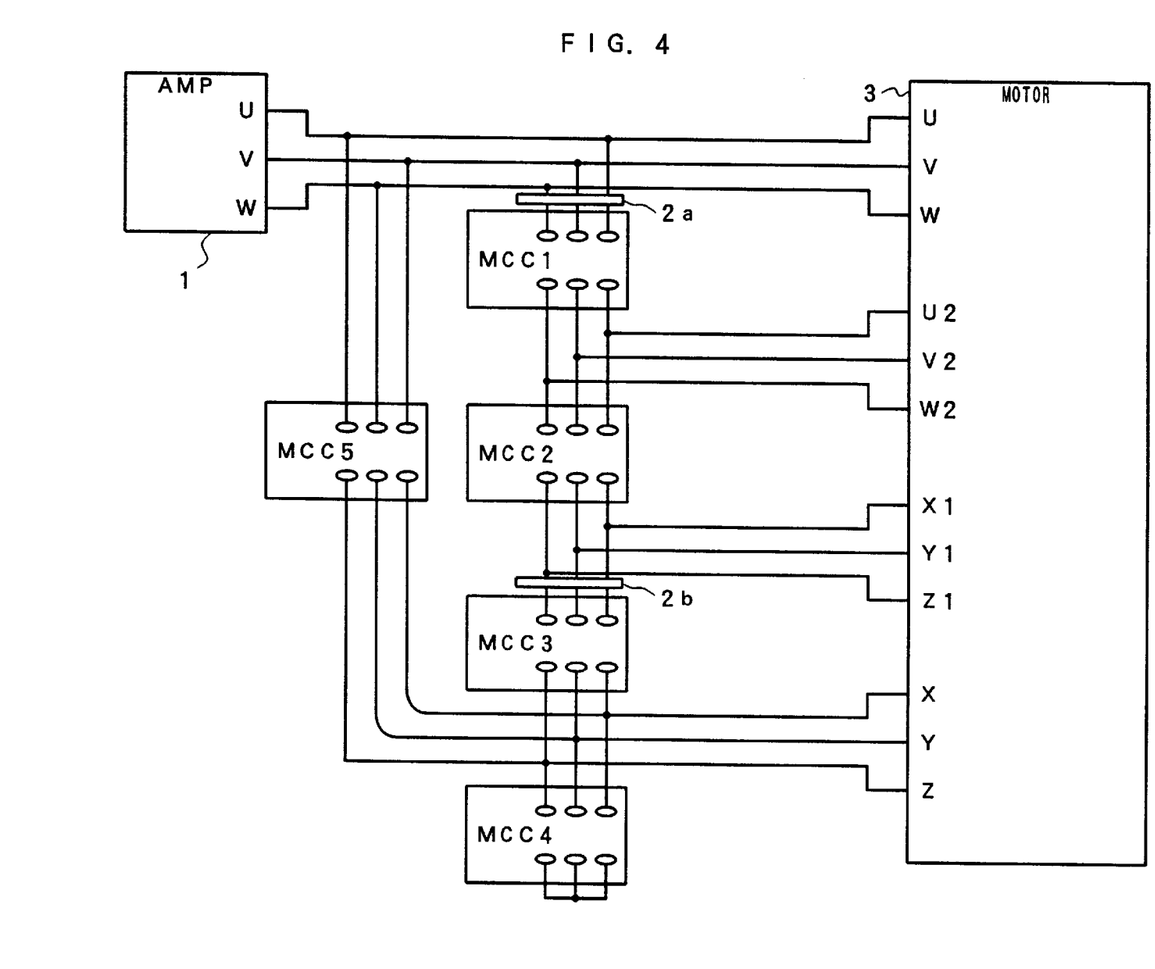
FIG. 4 is a circuit diagram of another embodiment for switching the winding formation.

In the embodiment shown in FIG. 3, the reactor 2 is connected to an output of the amplifier so that the reactor 2 may act for any of the winding formations from the low speed winding formation to the high speed winding formation. The reactor is needed for high speed rotation but is not definitely needed for low speed rotation. FIG. 4 shows an example where a reactor is inserted only for the medium high speed winding formation and the high speed winding formation. In FIG. 4, reference signs 2a and 2b denote reactors, which are inserted only for the medium high speed winding formation and the high speed winding formation. The reactors 2a and 2b need to have the same inductance. Since the electromagnetic contactors MCC1 and MMC3 are brought into an on-state for the medium high speed winding formation and the high speed winding formation, and brought into an off-state for the low speed winding formation and the medium low speed winding formation, it serves the purpose if the reactors having the same inductance are connected to both the electromagnetic contactors MCC1 and MMC3.

In the above described embodiment, four winding formations for four stages from the low speed rotation to the high speed rotation, that is, the low speed winding formation, the medium low speed winding formation, the medium high speed winding formation, and the high speed winding formation are provided. If all of the four stages do not need to be provided for choice, one of them may be omitted so that a choice may be made from three winding formations.

As described above, in the present embodiment, the same number of winding components having the same number of turns are provided for each phase. Winding components for each phase are connected in series or in parallel to thereby form a winding for each phase, and thus formed three windings are connected to form a Δ-connection or a Y-connection. Thus, a plurality of winding formations having different numbers of turns are provided. In any of the winding formations, all the winding components are used. Therefore, the windings have smaller resistance than conventional ones, so that an induction motor having high power, small energy loss and low heating can be obtained. Further, by using all the winding components, winding formations showing a large turns ratio can be obtained, so that large torque can be produced with low speed rotation and high power can be obtained with high speed rotation. Further, since there is no unused winding component, voltage is not induced, so that reliability is improved. Further, since the winding formation can be switched by three or four stages, a fall in power at the time of switching can be reduced or removed. Thus, a high power characteristic can be obtained in a wide range. Therefore, when the induction motor according to the present invention is used as a spindle motor for driving a spindle of a machine tool, heavy cutting and high speed cutting are both possible, and the efficiency of cutting work is improved.

According to the present invention, an induction motor having higher reliability under high pressure, higher speed, higher power, larger torque and lower heating than conventional ones can be obtained. Further, since the winding formation can be switched by three or four stages, a fall in power at the time of switching can be reduced or removed, so that a high power characteristic can be obtained in a wide range.

What is claimed is:

1. An induction motor, comprising:

two or more winding components for each of three phases, said winding components having the same number of turns; and a switching circuit for switching connection of said winding components to any one of a Y-connection in which said winding components for each of the three phases are connected in series, a Y-connection in which said winding components for each of the three phases are connected in parallel, and a Δ-connection in which said winding components for each of the three phases are connected in parallel, so that connecting direction of said winding components in each phase is maintained.

* * * * *

UNITED STATES PATENT AND TRADEMARK OFFICE
CERTIFICATE OF CORRECTION

PATENT NO. : 6,333,578 B1
DATED : December 25, 2001
INVENTOR(S) : Kosei Nakamura et al.

It is certified that error appears in the above-identified patent and that said Letters Patent is hereby corrected as shown below:

<u>Title page,</u>
Item [75], Inventors, "Shinpei Uemura" should be -- Shinpei Ichikawa --, established by Petition to Change Name (due to marriage) filed January 18, 2002.
Item [57], ABSTRACT, please change "α-connection" to -- Δ-connection --.

<u>Column 8,</u>
Line 4, after "series," please insert -- a Δ-connection in which said winding component for each of the three phases are connected in series, --.

Signed and Sealed this

Tenth Day of September, 2002

*Attest:*

JAMES E. ROGAN
*Director of the United States Patent and Trademark Office*

*Attesting Officer*